United States Patent
Severinsson et al.

(10) Patent No.: US 9,732,813 B2
(45) Date of Patent: Aug. 15, 2017

(54) PARK LOCK AND PAD WEAR ADJUSTING ARRANGEMENT FOR ELECTRICALLY ACTUATED BRAKE

(75) Inventors: Lars Severinsson, Hishult (SE); Anders Lindqvist, Landskrons (SE)

(73) Assignee: Haldex Brake Products AB (CH)

( * ) Notice: Subject to any disclaimer, the term of this patent is extended or adjusted under 35 U.S.C. 154(b) by 3005 days.

(21) Appl. No.: 11/618,343

(22) Filed: Dec. 29, 2006

(65) Prior Publication Data
US 2008/0156593 A1    Jul. 3, 2008

(51) Int. Cl.
| | |
|---|---|
| F16D 65/38 | (2006.01) |
| F16D 65/18 | (2006.01) |
| F16D 65/092 | (2006.01) |
| F16D 121/24 | (2012.01) |
| F16D 123/00 | (2012.01) |
| F16D 125/22 | (2012.01) |
| F16D 125/26 | (2012.01) |

(Continued)

(52) U.S. Cl.
CPC ........... F16D 65/18 (2013.01); F16D 65/092 (2013.01); F16D 65/183 (2013.01); F16D 2121/24 (2013.01); F16D 2123/00 (2013.01); F16D 2125/22 (2013.01); F16D 2125/26 (2013.01); F16D 2125/52 (2013.01); F16D 2127/10 (2013.01)

(58) Field of Classification Search
CPC ...... F16D 65/18; F16D 65/092; F16D 65/183; F16D 2121/24; F16D 2123/00; F16D 2125/22; F16D 2125/26; F16D 2125/52; F16D 2127/10

USPC ....................... 188/72.6, 72.7, 72.2, 156, 265
See application file for complete search history.

(56) References Cited

U.S. PATENT DOCUMENTS

| | | | |
|---|---|---|---|
| 4,653,614 A | 3/1987 | Price et al. | |
| 4,852,699 A | 8/1989 | Karnopp et al. | |

(Continued)

FOREIGN PATENT DOCUMENTS

| | | |
|---|---|---|
| WO | 03071150 | 8/2003 |
| WO | 2005028905 | 3/2005 |
| WO | 2006040006 | 4/2006 |

OTHER PUBLICATIONS

European Search Report, Mar. 11, 2008, 7 pages.

*Primary Examiner* — Bradley King
(74) *Attorney, Agent, or Firm* — St. Onge Steward Johnston and Reens LLC

(57) ABSTRACT

An electrically actuated brake assembly includes a brake disc, a brake pad, and an electric motor having a rotatable output shaft. A service brake transmission in operative rotational communication with the output shaft causes service braking of the vehicle in response to rotation of the output shaft, and an adjuster mechanism is operable to adjust a distance between the brake pad and the brake disc. An adjuster transmission operatively connected between the output shaft and the adjuster mechanism causes operative rotational communication between the output shaft and the adjuster mechanism when the adjuster transmission is engaged so as to transmit rotational movement of the output shaft to the adjuster mechanism, and causes there to be no operative rotational communication between the output shaft and the adjuster mechanism when the adjuster transmission is disengaged so as to not transmit rotational movement of the output shaft to the adjuster mechanism.

27 Claims, 11 Drawing Sheets

(51) Int. Cl.
 *F16D 125/52* (2012.01)
 *F16D 127/10* (2012.01)

(56) References Cited

U.S. PATENT DOCUMENTS

| | | |
|---|---|---|
| 4,946,007 A | 8/1990 | Pederson et al. |
| 4,974,704 A | 12/1990 | Miller et al. |
| 5,012,901 A | 5/1991 | Campbell et al. |
| 5,788,023 A | 8/1998 | Schoner et al. |
| 5,829,557 A | 11/1998 | Halasy-Wimmer et al. |
| 6,318,513 B1 | 11/2001 | Dietrich et al. |
| 2004/0060783 A1* | 4/2004 | Severinsson .................. 188/166 |
| 2004/0238294 A1* | 12/2004 | Baumann et al. ........... 188/72.1 |
| 2005/0016799 A1* | 1/2005 | Severinsson .................. 188/156 |
| 2005/0247527 A1 | 11/2005 | Severinsson |
| 2008/0210498 A1* | 9/2008 | Baumgartner et al. ...... 188/72.2 |

* cited by examiner

PARK LOCK AND PAD WEAR ADJUSTING ARRANGEMENT FOR ELECTRICALLY ACTUATED BRAKE

FIELD OF THE INVENTION

The present invention relates generally to a park lock and pad wear adjusting arrangement for an electrically actuated brake, and more particularly to such a park lock and pad wear adjusting arrangement that employs a single electrical motor to achieve both functions.

BACKGROUND OF THE INVENTION

Electromechanical brakes have been known for some time. U.S. Pat. No. 5,788,023 discloses a disc brake for a vehicle which can be actuated electrically and whose brake linings can be pressed against the brake disc with the aid of an electric motor. The electric motor transmits its actuation force, via a so-called planetary rolling-contact threaded spindle, onto an axially displaceably mounted piston which interacts with the brake lining.

U.S. Pat. No. 5,829,557 discloses another vehicle disc brake which can be actuated electrically and whose brake linings can, in turn, be pressed against the brake disc by means of an electric motor serving as an actuator. The electric motor comprises a spindle gear mechanism and, by means of a spindle element which can be of different designs, is connected, in the direction of displacement of the brake linings, to an axially displaceable piston which acts on a brake lining. In this patent, there is optional provision for the use of an additional gear mechanism for converting the torque and rotational speed.

A recognized disadvantage associated with conventional brakes with an electric actuator is the high actuator force which has to be applied in order to achieve a sufficient braking effect. The necessary high actuator force and the resulting large power demand of the actuator make it necessary to employ very large drive units, usually electric motors, which have large torques, and are also heavy and expensive. The result of this is that electromechanical brakes have, to date, not become widespread as vehicle brakes, for example.

In order to decrease the energy consumption of the brake actuators, so-called self-enforcing actuators have been proposed. Examples of such self-enforcing brakes can be found in U.S. Pat. Nos. 4,653,614, 4,852,699, 4,946,007, 4,974,704, 5,012,901, and 6,318,513 and in U.S. Patent Application Publication No. US 2005/0247527 (which is hereby incorporated by reference herein in its entirety). A self-enforcing brake works according to the principle that the actuation force amplifies itself. The friction force between the brake linings and the brake disc give rise, with help of a self-enforcing mechanism, to increased force against the brake linings and brake disc. This increased force gives, in turn, rise to increased friction force. Hence, it is possible to produce and control large braking forces by applying relatively moderate actuator forces.

More specifically, and referring specifically to the prior art self-enforcing brake actuator shown in FIG. 1, for brake application, an actuator force which is substantially transverse to the brake disc 1 (or in other words substantially axial) is applied on the ramp plate 2 in a way to be described, until contact between the brake pad 3 and the disc 1 is established. By means of the friction force, the ramp plate 2 is transferred in the rotation direction of the disc 1, so that the rollers 5 roll up the relevant ramps 2' and 4' and an application force is accomplished without applying any external brake force besides the actuator force. In other words, the brake has a self-servo effect or is self-enforcing. The application force may be controlled by the actuator force, which may be positive or negative, i.e., acting in a brake applying or brake releasing direction.

The disc brake shown in FIG. 1 is arranged in a disc brake caliper 6 in a way well known in the art. The caliper 6, which is placed astraddle of the brake disc 1, is only very schematically illustrated by shaded areas indicating attachment or support portions. The ramp bridge 4 is connected to the caliper 6 by means of two adjustment screws 7 in two threaded bores in the ramp bridge 4.

The mechanism for creating the actuator force for service braking is now to be described. An electric motor 8 can rotate a drive shaft 9 in either direction over a transmission unit 10. A bevel gear 11 supported by an arm 12 from the ramp bridge 4 can be rotated by the shaft 9 but is axially movable thereon by a splined engagement. The bevel gear 11 is in driving engagement with a bevel gear disc 13 rotationally supported by the ramp bridge 4. Eccentrically connected to the bevel gear disc 13 is a crank rod 14, which at its other end is rotationally connected to the ramp plate 2.

By turning the bevel gear disc 13 in either direction by means of the bevel gear 11 from the motor 8, the position of the ramp plate 2 in relation to the ramp bridge 4 can be set. The actuator force is transmitted by the crank rod 14. When a frictional engagement between the brake pad 3 and the brake disc 1 has been established, an application force amplification will be accomplished by the rollers 5 climbing its ramps 2' and 4' in response to the tangential movement of the ramp plate 2 caused by the frictional engagement with the brake disc 1. The application force may be accurately controlled by rotating the motor 8 in either direction. The adjustment screws 7 have the purpose of adjusting the position of the ramp bridge 4 in relation to the wear of the brake pad 3 (and the corresponding brake pad on the opposite side of the brake disc 1). The synchronous rotation of the adjustment screws 7 is performed by suitable transmission means, such as a chain 15, driven from the transmission 10 unit in a way not further described.

While the self-enforcing brake shown in FIG. 1 and described above provides clear advantageous over prior designs, it will be recognized by one skilled in the art that it includes no park lock (i.e., parking brake) functionality. Thus, such brakes typically require a separate parking brake, which obviously is disadvantageous from standpoints of added cost, complexity and weight. Attempts have been made to obviate these disadvantages by designing electromechanical brake actuators with integrated park lock functionality, such as by providing spring bias means for applying the brake when parked, and/or by incorporating a second electrical motor or a separate hydraulic or pneumatic system for applying the parking brake when desired.

However, while some of these more recent designs do have advantages over designs incorporating a separate parking brake, they still suffer from many of the same disadvantages, as well as others. The applicant of the present invention has recognized that it would be far more desirable for a brake actuator to employ a single electrical motor which is used to actuate the service brakes, to compensate for pad wear and to apply the park lock functionality.

What is desired, therefore, is an electrically actuated brake assembly which is lower in cost, weight and complexity as compared to known assemblies, which includes integrated pad wear compensation functionality, which includes integrated park lock functionality, which can be used with both self-enforcing and non self-enforcing brakes, and which employs a single electrical motor to actuate the service brakes, to compensate for pad wear and to apply the park lock functionality.

SUMMARY OF THE INVENTION

Accordingly, it is an object of the present invention to provide an electrically actuated brake assembly which is lower in cost, weight and complexity as compared to known assemblies.

Another object of the present invention is to provide an electrically actuated brake assembly having the above characteristics and which includes integrated pad wear compensation functionality.

A further object of the present invention is to provide an electrically actuated brake assembly having the above characteristics and which includes integrated park lock functionality.

Still another object of the present invention is to provide an electrically actuated brake assembly having the above characteristics and which can be used with both self-enforcing and non self-enforcing brakes.

Yet a further object of the present invention is to provide an electrically actuated brake assembly having the above characteristics and which employs a single electrical motor to actuate the service brakes, to compensate for pad wear and to apply the park lock functionality.

These and other objects are achieved in accordance with one embodiment of the present invention by provision of an electrically actuated brake assembly having a brake disc in rotational engagement with a wheel of a vehicle, a brake pad which frictionally engages the brake disc when an actuator force is applied thereto, and an electric motor having an output shaft rotatable in both a forward direction and a reverse direction. A service brake transmission is in operative rotational communication with the output shaft of the electric motor, the service brake transmission causing the brake pad to move toward the brake disc and exert the actuator force thereon when the output shaft is rotated in the forward direction and causing the brake pad to move away from the brake disc and remove the actuator force therefrom when the output shaft is rotated in the reverse direction. At least one adjuster mechanism is rotatable in one direction to decrease a distance between the brake pad and the brake disc and in another direction to increase the distance between the brake pad and the brake disc. An adjuster transmission is operatively connected between the output shaft of the electric motor and the adjuster mechanism, the adjuster transmission causing operative rotational communication between the output shaft of the electric motor and the adjuster mechanism when the adjuster transmission is engaged so as to transmit rotational movement of the output shaft of the electric motor to the adjuster mechanism, and causing there to be no operative rotational communication between the output shaft of the electric motor and the adjuster mechanism when the adjuster transmission is disengaged so as to not transmit rotational movement of the output shaft of the electric motor to the adjuster mechanism.

In some embodiments, the adjuster transmission comprises an electrically actuated clutch. In certain of these embodiments, the clutch is disengaged when electrical power is supplied thereto and is engaged when no electrical power is supplied thereto. In some embodiments, the at least one adjuster mechanism comprises mating threaded parts in threaded engagement with one another, at least one of the threaded parts being operatively connected to the brake pad, and at least one other of the threaded parts being rotatable by the adjuster transmission.

In some embodiments, the electrically actuated brake assembly further includes a plate having at least one threaded recess in a face thereof facing the brake pad, and the at least one adjuster mechanism comprises a threaded insert disposed in threaded engagement within the threaded recess of the plate, the threaded insert connected to the brake pad. In certain of these embodiments, operation of the service brake transmission causes axial movement of the plate, the at least one adjuster mechanism and the brake pad. In certain embodiments, operation of the adjuster transmission causes rotational movement of the at least one adjuster mechanism and, due to the threaded engagement between the at least one adjuster mechanism and the recess in the plate, axial movement of the at least one adjuster mechanism and the brake pad.

In some embodiments, the electrically actuated brake assembly further includes a spring exerting a force on the brake pad in series with the actuator force caused by operation of the service brake transmission. In certain of these embodiments, the spring is a torsion spring arranged to exert a rotational force on the output shaft of the motor. In certain embodiments, the spring is a compression spring arranged to exert an axial force on the brake pad. In certain embodiments, the spring is a compression spring arranged to exert a rotational force on the output shaft of the motor. In some embodiments, the at least one adjuster mechanism is prevented from rotating when the actuator force is applied. In some embodiments, the adjuster transmission is employed both to control clearance between the brake pad and the brake disc and as a park lock. In some embodiments, the brake assembly is a self-enforcing brake assembly.

In some embodiments, the electric motor comprises two electric motors, at least one of which is operatively connected to the adjuster mechanism via the adjuster transmission. In certain of these embodiments, the service brake transmission is at least partially split into two branches, each of the two branches being in operative rotational communication with one of the two electric motors.

In accordance with another embodiment of the present invention, an electrically actuated brake assembly includes a brake disc, a brake pad, and an electric motor having a rotatable output shaft. A service brake transmission is in operative rotational communication with the output shaft of the electric motor, the service brake transmission causing service braking of the vehicle in response to rotation of the output shaft of the electric motor, and at least one adjuster mechanism is operable to adjust a distance between the brake pad and the brake disc. An adjuster transmission is operatively connected between the output shaft of the electric motor and the adjuster mechanism, the adjuster transmission causing operative rotational communication between the output shaft of the electric motor and the adjuster mechanism when the adjuster transmission is engaged so as to transmit rotational movement of the output shaft of the electric motor to the adjuster mechanism, and causing there to be no operative rotational communication between the output shaft of the electric motor and the adjuster mechanism when the adjuster transmission is disengaged so as to not transmit rotational movement of the output shaft of the electric motor to the adjuster mechanism.

In some embodiments, the adjuster transmission comprises an electrically actuated clutch. In certain of these embodiments, the clutch is disengaged when electrical power is supplied thereto and is engaged when no electrical power is supplied thereto. In some embodiments, the at least one adjuster mechanism comprises mating threaded parts in threaded engagement with one another, at least one of the threaded parts being operatively connected to the brake pad, and at least one other of the threaded parts being rotatable by the adjuster transmission.

In some embodiments, the electrically actuated brake assembly further includes a plate having at least one threaded recess in a face thereof facing the brake pad, and the at least one adjuster mechanism comprises a threaded insert disposed in threaded engagement within the threaded recess of the plate, the threaded insert connected to the brake pad. In certain of these embodiments, operation of the service brake transmission causes axial movement of the plate, the at least one adjuster mechanism and the brake pad. In certain embodiments, operation of the adjuster transmission causes rotational movement of the at least one adjuster mechanism and, due to the threaded engagement between the at least one adjuster mechanism and the recess in the plate, axial movement of the at least one adjuster mechanism and the brake pad.

In some embodiments, the electrically actuated brake assembly further includes a spring exerting a force on the brake pad in series with actuator force caused by operation of the service brake transmission. In certain of these embodiments, the spring is a torsion spring arranged to exert a rotational force on the output shaft of the motor. In certain embodiments, the spring is a compression spring arranged to exert an axial force on the brake pad. In certain embodiments, the spring is a compression spring arranged to exert a rotational force on the output shaft of the motor. In some embodiments, the at least one adjuster mechanism is prevented from rotating when actuator force is applied. In some embodiments, the adjuster transmission is employed both to control clearance between the brake pad and the brake disc and as a park lock. In some embodiments, the brake assembly is a self-enforcing brake assembly.

In some embodiments, the electric motor comprises two electric motors, at least one of which is operatively connected to the adjuster mechanism via the adjuster transmission. In certain of these embodiments, the service brake transmission is at least partially split into two branches, each of the two branches being in operative rotational communication with one of the two electric motors.

The invention and its particular features and advantages will become more apparent from the following detailed description considered with reference to the accompanying drawings.

DETAILED DESCRIPTION OF AN EMBODIMENT OF THE INVENTION

Figure 2:
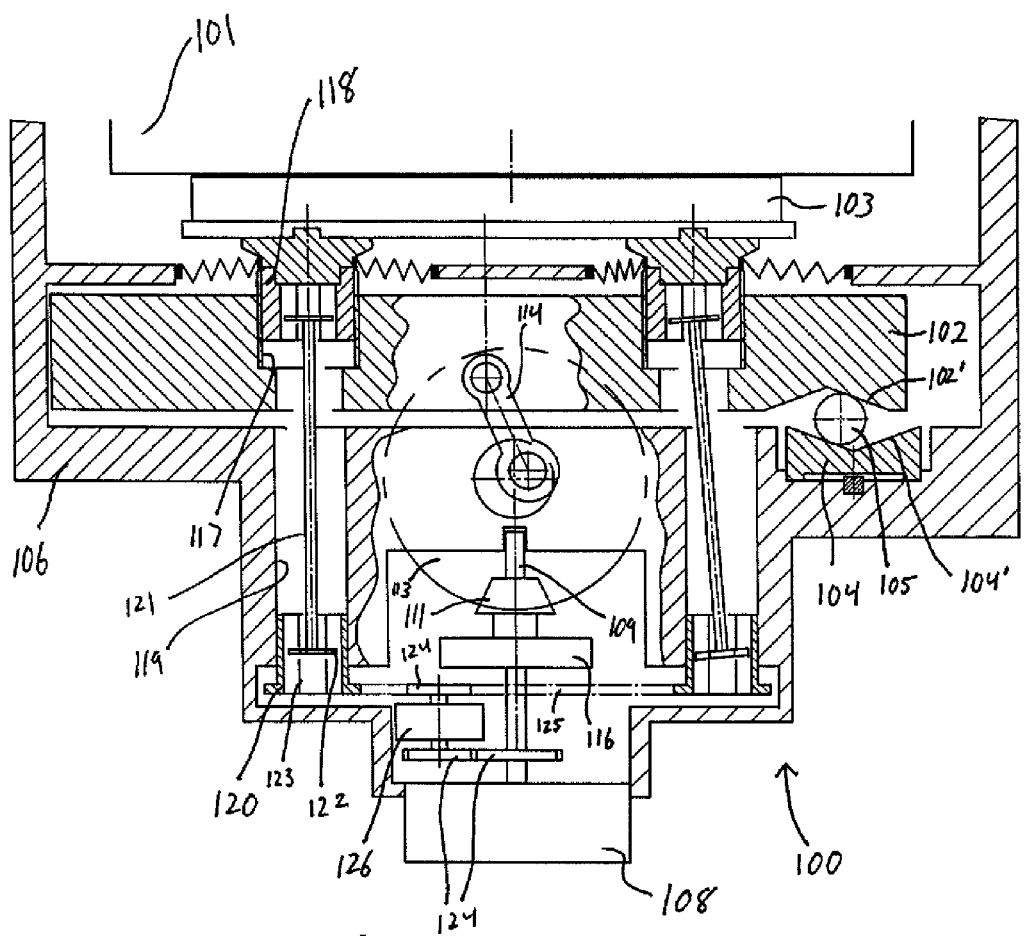
FIG. 2 is a schematic partially cross-sectional view of an electrically actuated brake assembly in accordance with an exemplary embodiment of the present invention, with the right half of the Figure illustrating an assembly with self-enforcing characteristics and the left half of the Figure illustrating an assembly without self-enforcing characteristics.

Referring now to FIG. 2, an electrically actuated brake assembly 100 in accordance with an exemplary embodiment of the present invention is shown. It should be noted that in FIG. 2, as well as in FIGS. 3, 4A and 9A, the right half of the Figure illustrates an assembly with self-enforcing characteristics and the left half of the Figure illustrates an assembly without self-enforcing characteristics.

Brake assembly 100 includes a brake disc 101, a ramp plate 102 and a brake pad 103. When brake pad 103 is brought into contact with brake disc 101 (as described more fully below), ramp plate 102 is transferred, by means of frictional forces between brake pad 103 and brake disc 101, in the rotational direction of the brake disc 101, so that the rollers 105 roll up the relevant ramps 102' in ramp plate 102 and ramps 104' in ramp bridge 104 and an application force is accomplished without applying any substantial external brake force besides the actuator force. In other words the brake has a self-servo effect or is self-enforcing. The application force may be controlled by the actuator force, which may be positive or negative, i.e., acting in a brake applying or brake releasing direction.

As will be recognized by those skilled in the art, when the brake assembly is a non self-enforcing brake assembly, ramps 102', 104', rollers 105 and ramp bridge 104 are not necessary, and that ramp plate 102 may be considered as simply a plate, rather than a ramp plate. It should also be noted that when the brake assembly is a non self-enforcing brake assembly, plate 102 is typically not transferred in the rotational direction of the brake disc 101.

The brake assembly is arranged in a disc brake caliper 106 in a way well known in the art. The caliper 106, which is placed astraddle of the brake disc 101, is only schematically illustrated. The ramp bridge 104 is connected to the caliper 106.

An electric motor 108 can rotate an output shaft 109 in either direction. A bevel gear 111 is carried on the output shaft and rotates therewith. The bevel gear 111 is in driving engagement with a bevel gear disc 113 rotationally supported by the caliper 106. Eccentrically connected to the bevel gear disc 113 is a crank rod 114, which at its other end is rotationally connected to the ramp plate 102.

By turning the bevel gear disc 113 in either direction by means of the bevel gear 111 from the motor 108, the position of the ramp plate 102 in relation to the caliper 106 can be set. The actuator force is transmitted by the crank rod 114. In the self-enforcing embodiments, when a frictional engagement between the brake pad 103 and the brake disc 101 has been established, an application force amplification will be accomplished by the rollers 105 climbing its ramps 102', 104' in response to the tangential movement of the ramp plate 102 caused by the frictional engagement with the brake disc 101. The application force may be accurately controlled by rotating the motor 108 in either direction. In the non self-enforcing embodiments, operation is substantially similar, except that the motor 108 will typically be required to exert greater forces on plate 102 because no force amplification is provided.

The bevel gear 111, the bevel gear disc 113 and the crank rod 114 together comprise a service brake transmission.

If desired, a spring 116 may be provided for exerting a force on the plate 102, and thereby the brake pad 103, in series with the actuator force caused by operation of the service brake transmission in order to avoid a decrease in the demanded force on the brake disc 101 due to cooling (i.e., parts shrinking). Preferably, the spring 116 is configured such that it avoids adding elasticity during normal service brake application. In FIG. 2, spring 116 is configured as a torsion spring arranged to exert a rotational force on the output shaft 109 of the motor 108.

Plate 102 includes two threaded recesses 117 in a face thereof facing the brake pad 103. A threaded insert 118 is disposed in threaded engagement within each threaded recess 117 of the plate 102, such that rotation of the threaded insert 118 in one direction causes the threaded insert 118 to move further into the threaded recess 117, while rotation of the threaded insert 118 in the other direction causes the threaded insert 118 to move outward from the threaded recess 117. The threaded inserts 118 are connected the brake pad 103, such that rotational movement of the threaded inserts 118 in one direction decreases a distance between the brake pad 103 and the brake disc 101 and that rotational movement of the threaded inserts 118 in the other direction increases a distance between the brake pad 103 and the brake disc 101.

The caliper includes through bores 119, at an end of which are disposed therein bushings 120 or the like, which bushings 120 are rotatable within bores 119. Threaded inserts 118 are rotatably coupled to bushings 120 by way of rods 121 which extend from bushings 120, through bores 119 and recesses 117 and to threaded inserts 118. Threaded inserts 118 and bushings 120 are coupled such that they rotate together, but also such that they are axially displaceable with respect to one another. More specifically, while bushings 120 are rotatable within bores 119, they are axially fixed therein and therefore are axially fixed with respect to caliper 106. However, as discussed above, application of the brake is accomplished by axial movement, via service brake transmission, of plate 102, with which threaded inserts 118 are carried, such that threaded inserts 118 axially move with respect to bushings 120 during brake application. Also as discussed above, rotation of threaded inserts 118 causes axial displacement thereof with respect to plate 102 in order to adjust the pad gap clearance, such that axial displaceability between threaded inserts 118 and bushings 120 is required here also.

Figure 1:
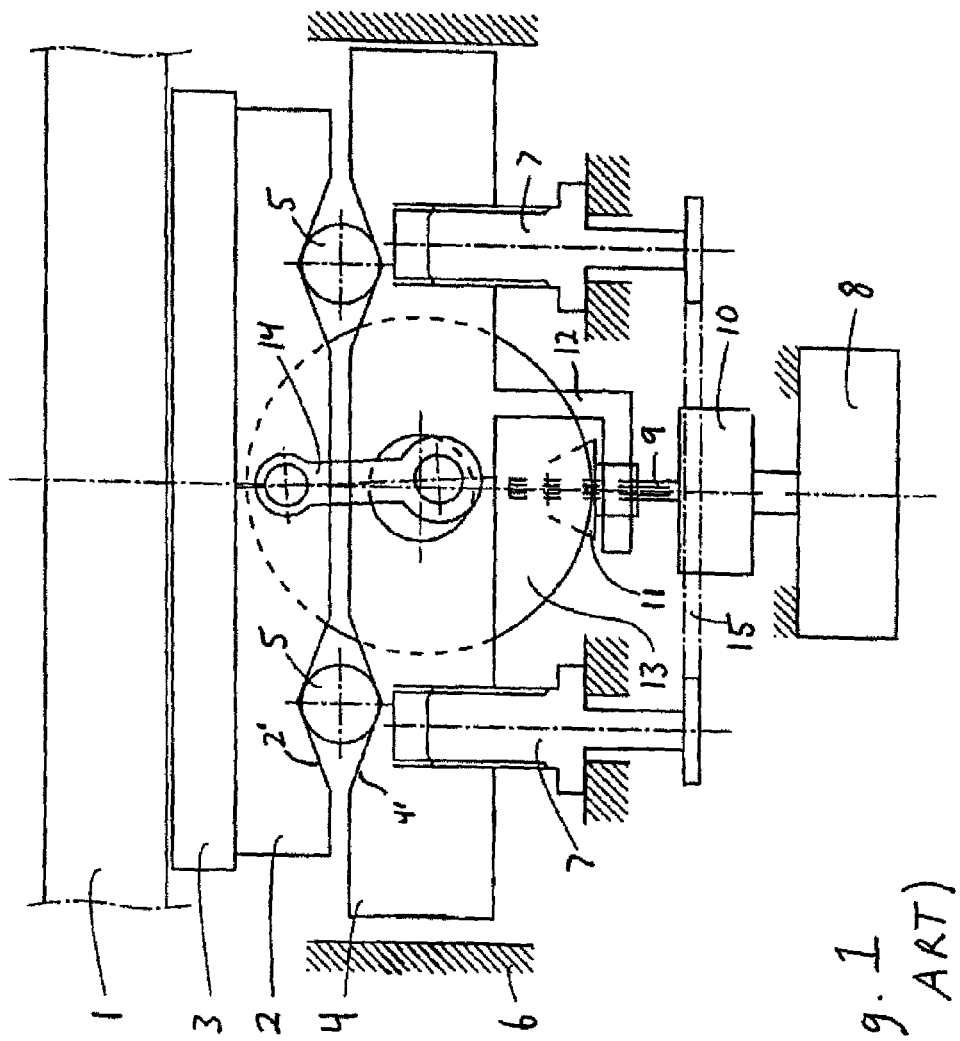
FIG. 1 is a schematic partially cross-sectional view of a prior art electrically actuated brake assembly with self-enforcing characteristics.

In order to achieve such axial displaceability, rods 121 include at each end thereof an end member having a plurality of teeth 122 which cooperate with a plurality of splines 123 disposed on internal bores of threaded inserts 118 and bushings 120. The cooperation of teeth 122 and splines 123 allows for rotational coupling, but also allows for axial displacement. If desired, the teeth 122 and splines 123 configuration may be disposed at only one end of rods 121, with the other end being both rotationally and axially fixed with respect to one of threaded inserts 118 or bushings 120, since relative axial displacement between threaded inserts 118 and bushings 120 could still be achieved. In self-enforcing assemblies, as shown in the right half of FIG. 1, rods 121 are also capable of angular deflection with respect to threaded inserts 118 and bushings 120 to allow for displacement of the ramp plate 102 with respect to the ramp bridge, and therefore the caliper 106.

The threaded inserts 118, the bushings 120 and the rods 121, as well as the various parts thereof, together comprise adjuster mechanisms.

The adjuster mechanisms are selectively rotationally engageable, in a synchronized fashion, with the output shaft 109 of the motor 108 via one or more gears 124 and/or chains, belts or the like 125, and via an adjuster transmission 126. The adjuster transmission 126 is designed to cause operative rotational communication between the output shaft 109 of the electric motor 108 and the adjuster mechanisms when the adjuster transmission 126 is engaged so as to transmit rotational movement of the output shaft 109 to the adjuster mechanisms, and to cause there to be no operative rotational communication between the output shaft 109 of the electric motor 108 and the adjuster mechanisms when the adjuster transmission 126 is disengaged so as to not transmit rotational movement of the output shaft 109 to the adjuster mechanisms.

More specifically, the adjuster transmission 126 may take the form of an electrically actuated clutch, many examples of which are well known in the art, and which is therefore not discussed herein in detail. It has been found that employing an electrically actuated clutch that is disengaged when electrical power is supplied thereto and is engaged when no electrical power is supplied thereto provides desirable results.

Figure 3:
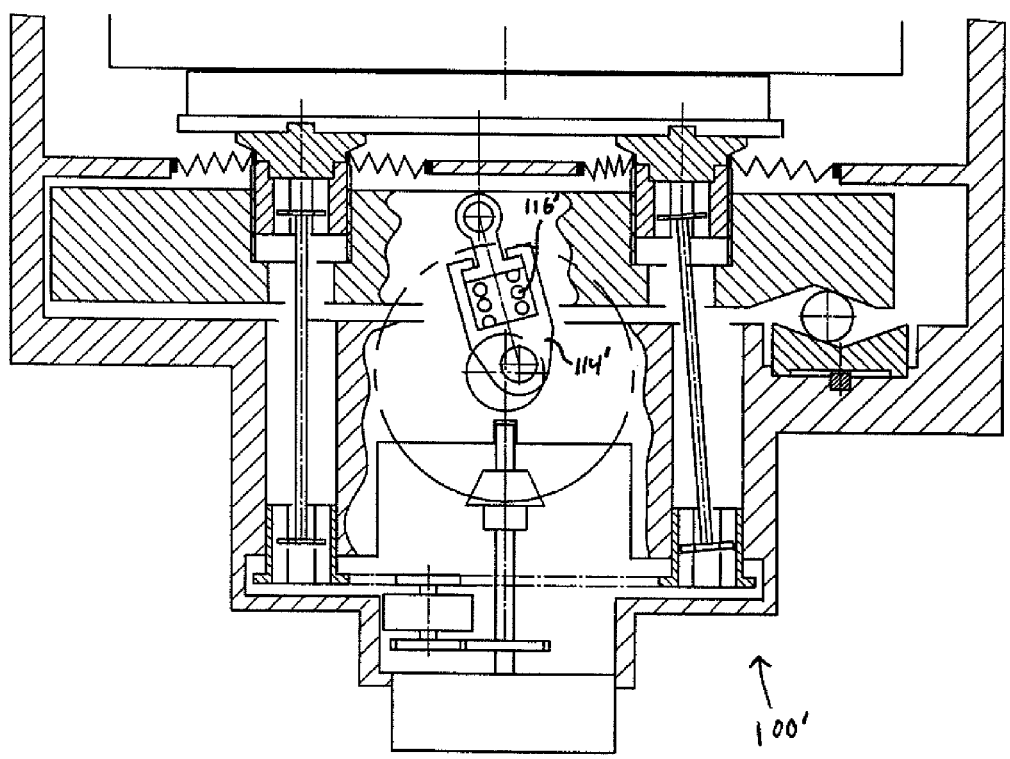
FIG. 3 is a schematic partially cross-sectional view of the electrically actuated brake assembly of FIG. 2 incorporating a slightly different spring configuration, with the right half of the Figure illustrating an assembly with self-enforcing characteristics and the left half of the Figure illustrating an assembly without self-enforcing characteristics.
Figures 4A, 4B:
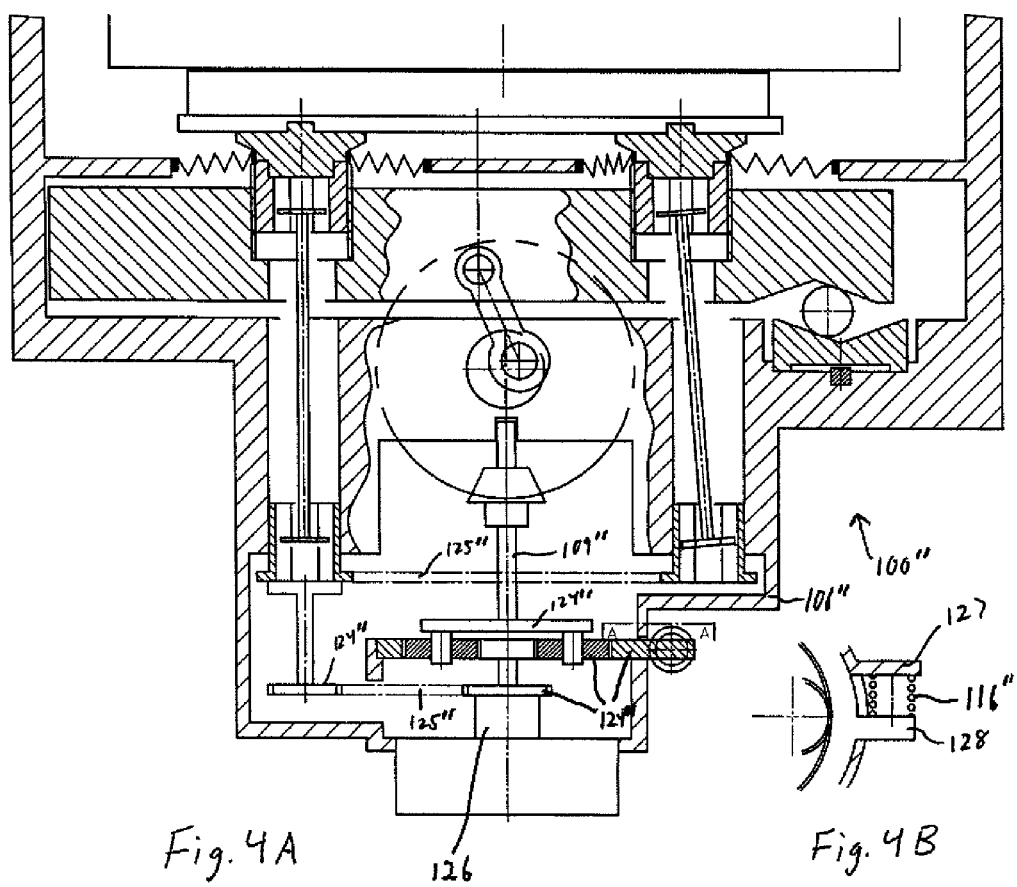
FIG. 4A is a schematic partially cross-sectional view of the electrically actuated brake assembly of FIG. 2 incorporating a slightly different spring configuration, with the right half of the Figure illustrating an assembly with self-enforcing characteristics and the left half of the Figure illustrating an assembly without self-enforcing characteristics.
FIG. 4B is a schematic partially cross-sectional view, taken along line A-A of FIG. 4A illustrating in greater detail the configuration of the spring.

Referring now to FIG. 3, an electrically actuated brake assembly 100' nearly identical to the assembly 100 of FIG. 2 is shown. As with FIG. 2, the right half of FIG. 3 illustrates an assembly with self-enforcing characteristics and the left half of FIG. 3 illustrates an assembly without self-enforcing characteristics. Substantially the only difference between the assembly 100' shown in FIG. 3 and the assembly 100 shown in FIG. 2 is that, in assembly 100', spring 116' is a compression spring arranged to exert an axial force on the brake pad 103. In order to accommodate such a spring 116', crank rod 114' is modified to comprise a telescoping or piston-type arrangement. Preferably, the spring 116' is configured such that it avoids adding elasticity during normal service brake application. In substantially all other respect, assembly 100' is configured and operates as does assembly 100, discussed in detail above. As such, a description of the other elements of assembly 100' is not repeated Referring now to FIGS. 4A and 4B, an electrically actuated brake assembly 100" substantially similar to the assembly 100 of FIG. 2 is shown. As with FIG. 2, the right half of FIG. 4A illustrates an assembly with self-enforcing characteristics and the left half of FIG. 4A illustrates an assembly without self-enforcing characteristics. The main difference between the assembly 100" shown in FIGS. 4A and 4B and the assembly 100 shown in FIG. 2 is that, in assembly 100", spring 116" is arranged to exert a rotational force on the output shaft 109" of the motor 108, and comprise a compression spring. In order to accommodate such a spring 116", the output shaft 109", the gears 124" and the chains, belts or the like 125" are modified as shown in FIGS. 4A and 4B. Preferably, the spring 116" is configured such that it avoids adding elasticity during normal service brake application. An extension 127 is provided on the caliper 106" and an opposing extension 128 is provided on one or more of the gears 124" with the spring 116" disposed therebetween to provide compressive or torsional forces between extensions 127, 128 which exert a rotational force on the output shaft 109 via the gears 124". In substantially all other respect, assembly 100" is configured and operates as does assembly 100, discussed in detail above. As such, a description of the other elements of assembly 100" is not repeated.

Figures 4C, 4D:
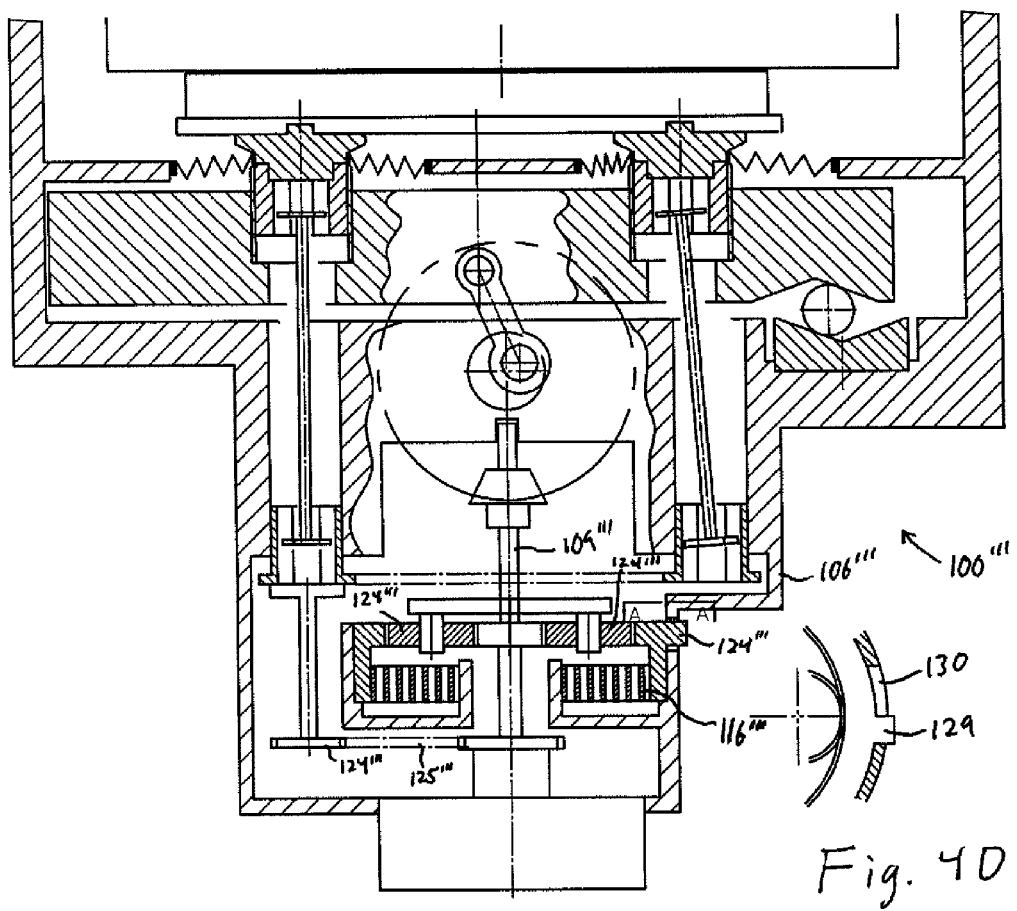
FIG. 4C is a schematic partially cross-sectional view of the electrically actuated brake assembly of FIG. 2 incorporating a slightly different spring configuration, with the right half of the Figure illustrating an assembly with self-enforcing characteristics and the left half of the Figure illustrating an assembly without self-enforcing characteristics.
FIG. 4D is a schematic partially cross-sectional view, taken along line A-A of FIG. 4C illustrating in greater detail the configuration of the spring.

Referring now to FIGS. 4C and 4D, an electrically actuated brake assembly 100''' substantially similar to the assembly 100 of FIG. 2 is shown. As with FIG. 2, the right half of FIG. 4C illustrates an assembly with self-enforcing characteristics and the left half of FIG. 4C illustrates an assembly without self-enforcing characteristics. The main difference between the assembly 100''' shown in FIGS. 4C and 4D and the assembly 100 shown in FIG. 2 is that, in assembly 100''', spring 116''' is arranged to exert a rotational force on the output shaft 109''' of the motor 108, and comprises a torsion or clock spring. In order to accommodate such a spring 116''', the output shaft 109''', the gears 124''' and the chains, belts or the like 125''' are modified as shown in FIGS. 4C and 4D. Preferably, the spring 116''' is configured such that it avoids adding elasticity during normal service brake application. An extension 129 is provided on one of gears 124''' and a corresponding slot 130 is provided in caliper 106''' in order to limit the torsional movement caused by spring 116'''. In substantially all other respect, assembly 100''' is configured and operates as does assembly 100, discussed in detail above. As such, a description of the other elements of assembly 100''' is not repeated.

Referring now to FIGS. 5A-8B, operation of the various features of electrically actuated brake actuators 100, 100', 100" is graphically shown.

Figure 5A:
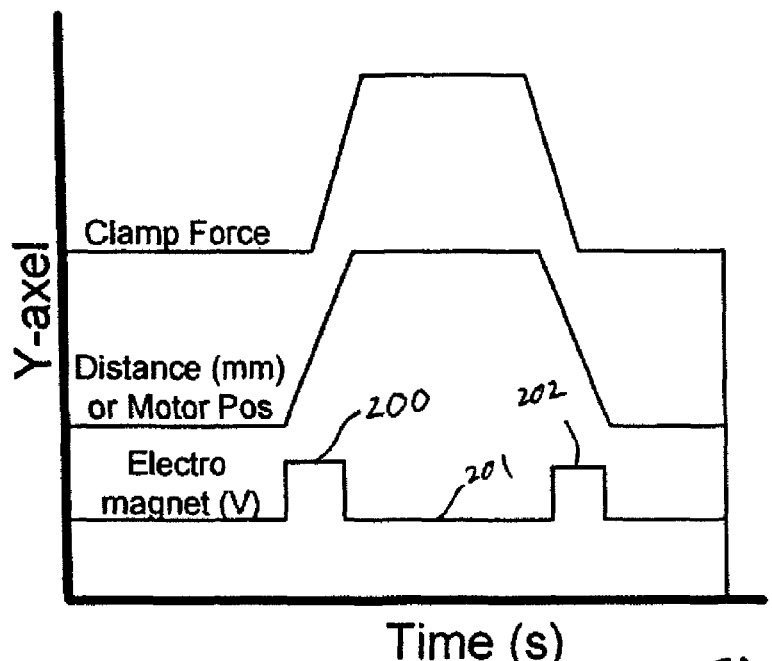
FIG. 5A is a graphical representation illustrating application of the parking brake functionality of the electrically actuated brake assembly of FIG. 2 when the assembly does not include a spring.
Figure 5B:
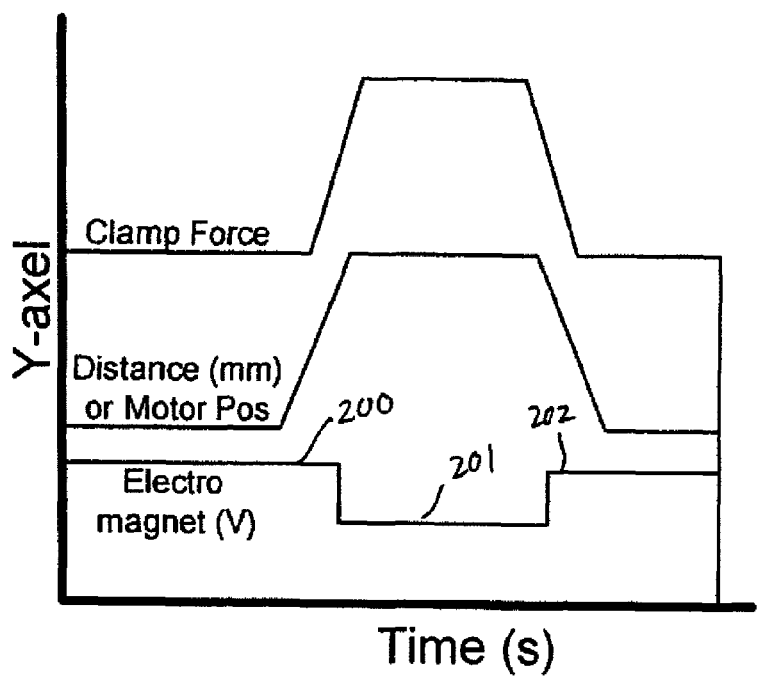
FIG. 5B is a graphical representation illustrating an alternative application of the parking brake functionality of the electrically actuated brake assembly of FIG. 2 when the assembly does not include a spring.

FIGS. 5A and 5B graphically illustrate application of the parking brake. Referring specifically to FIG. 5A, the adjuster transmission 126 is disengaged (i.e., the electrically actuated clutch is electrically powered so it is mechanically released), as shown at 200, and the motor 108 applies actuator force to the required level. When the adjuster mechanism is exposed to the actuator force, the threaded inserts 118 are locked so that they can not rotate. If the adjuster transmission 126 is engaged (i.e., electrical power to the electrically actuated clutch cut off so that it is mechanically locked), as shown at 201, the applied actuator force is maintained. In order to remove the actuator force, the adjuster transmission 126 is again disengaged (i.e., the electrically actuated clutch is again electrically powered so it is mechanically released), as shown at 202, and the motor 108 rotates the shaft 109 in the opposite direction to remove the actuator force.

FIG. 5B shows an alternative operation of the parking brake function, the difference being that the default is for the adjuster transmission 126 to be disengaged (i.e., with the electrically actuated clutch being electrically powered so it is mechanically released).

Figure 6A:
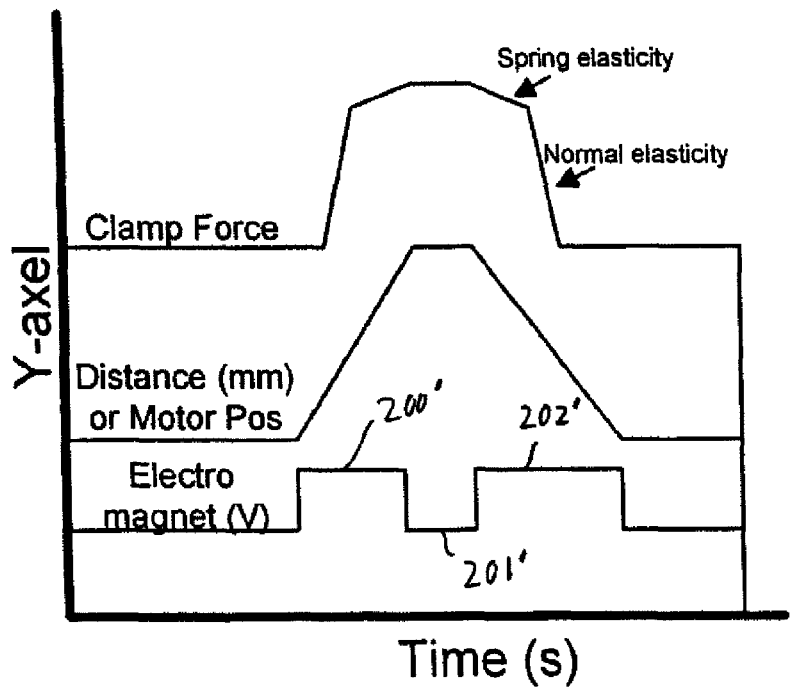
FIG. 6A is a graphical representation illustrating application of the parking brake functionality of the electrically actuated brake assembly of FIG. 2 when the assembly includes a spring.
Figure 6B:
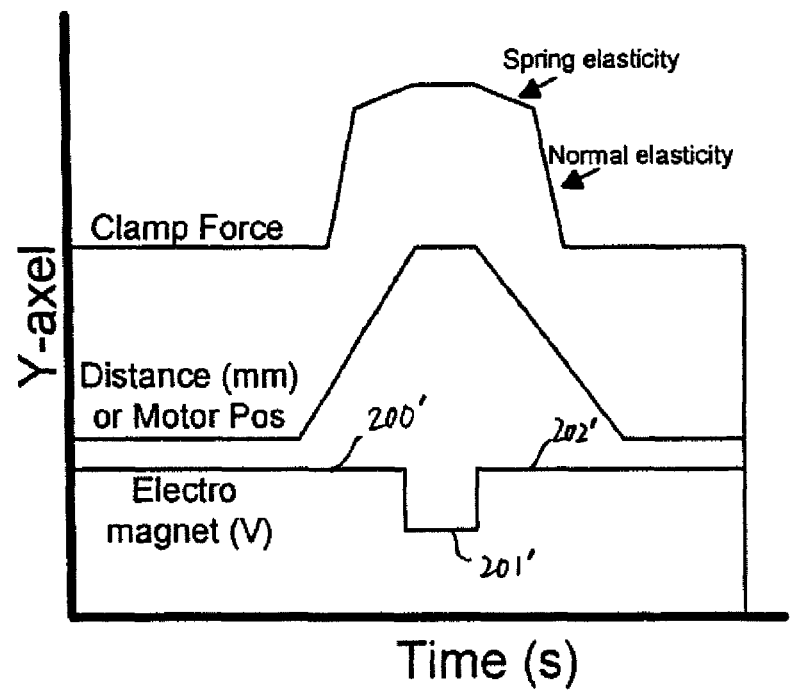
FIG. 6B is a graphical representation illustrating an alternative application of the parking brake functionality of the electrically actuated brake assembly of FIG. 2 when the assembly includes a spring.

As shown in FIGS. 6A and 6B, which also graphically illustrate application of the parking brake, if a spring 116, 116', 116" is provided for exerting a force on the brake pad 103 in series with the actuator force caused by operation of the service brake transmission, the elasticity of the spring 116, 116', 116" is preferably in the region above the "normal" actuator force.

Figure 7A:
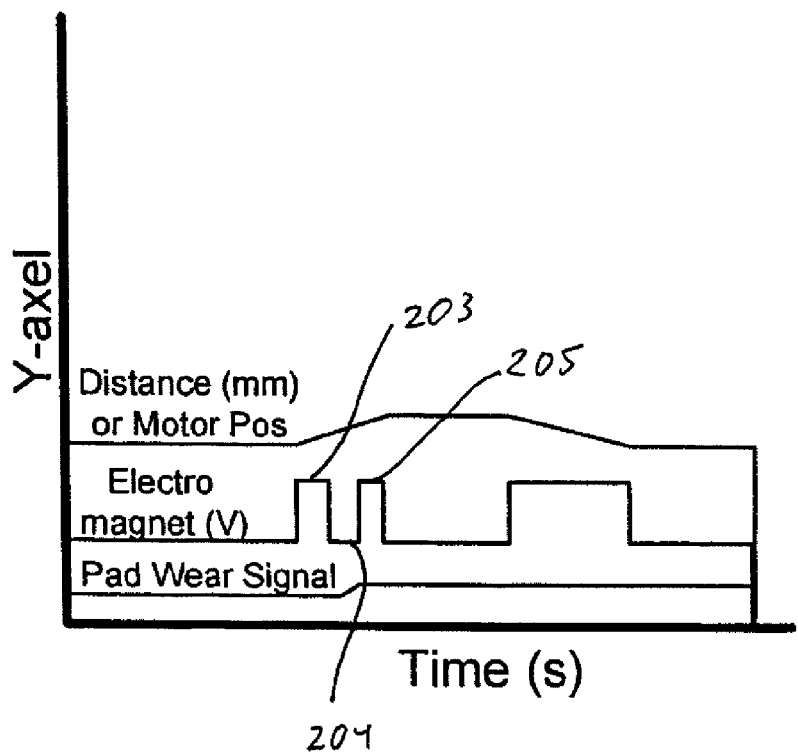
FIG. 7A is a graphical representation illustrating pad wear adjusting functionality of the pad toward the disc of the electrically actuated brake assembly of FIG. 2.
Figure 7B:
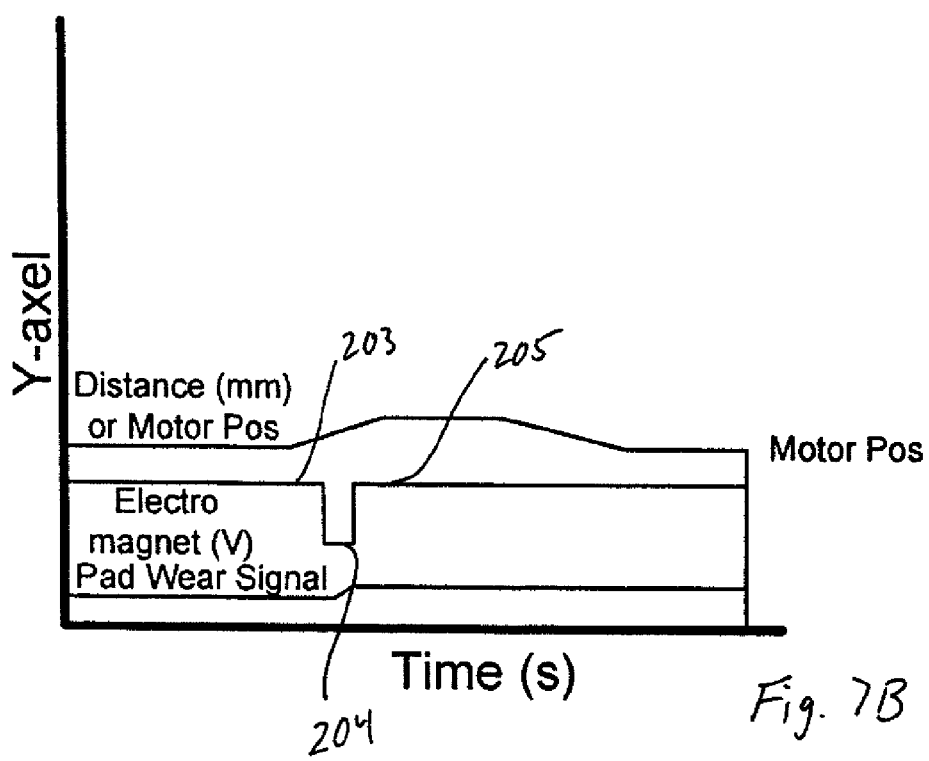
FIG. 7B is a graphical representation illustrating an alternative pad wear adjusting functionality of the pad toward the disc of the electrically actuated brake assembly of FIG. 2.

Referring now to FIGS. 7A and 7B, the pad wear adjustment functionality, wherein the brake pad 103 is moved closer to the brake disc 101, is graphically illustrated. It should be understood that this function is only active when there is no actuator force.

Referring specifically to FIG. 7A, the adjuster transmission 126 is disengaged (i.e., the electrically actuated clutch is electrically powered so it is mechanically released), as shown at 203, and the motor 108 rotates the output shaft 109 so that the pad is moved forward, via the service brake transmission, to the achieve the desired gap between the brake pad 103 and the brake disc 101 (typically about 0.7 mm). If the adjuster transmission 126 is engaged (i.e., electrical power to the electrically actuated clutch cut off so that it is mechanically locked), as shown at 204, the adjuster mechanisms are engaged and the threaded inserts 118 can rotate together with the rods 121 and bushings 120 in order to compensate for wear of the brake pad 103 and the brake disc 101. The adjuster transmission 126 is again disengaged (i.e., the electrically actuated clutch is again electrically powered so it is mechanically released), as shown at 205 so that no further pad wear compensation is performed.

FIG. 7B shows an alternative operation of the pad wear compensation function, the difference being that the default is for the adjuster transmission 126 to be disengaged (i.e., with the electrically actuated clutch being electrically powered so it is mechanically released).

Figure 8A:
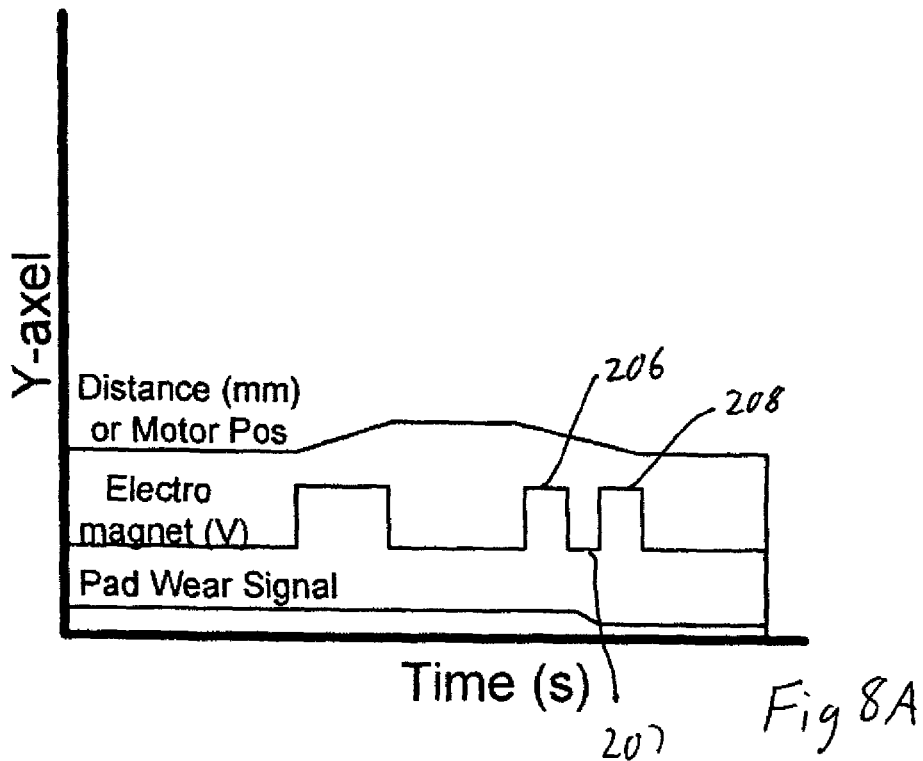
FIG. 8A is a graphical representation illustrating pad wear adjusting functionality of the pad away from the disc of the electrically actuated brake assembly of FIG. 2.
Figure 8B:
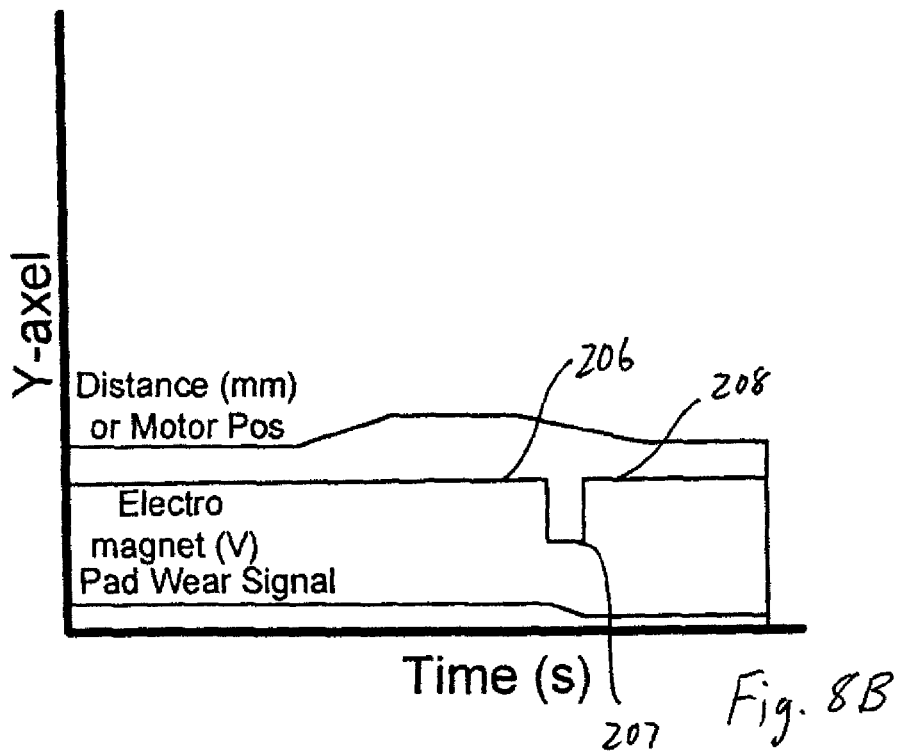
FIG. 8B is a graphical representation illustrating an alternative pad wear adjusting functionality of the pad away from the disc of the electrically actuated brake assembly of FIG. 2.

Referring now to FIGS. 8A and 8B, the pad wear adjustment functionality, wherein the brake pad 103 is moved away from the brake disc 101, is graphically illustrated. It should again be understood that this function is only active when there is no actuator force.

The adjuster transmission 126 is disengaged (i.e., the electrically actuated clutch is electrically powered so it is mechanically released), as shown at 206, and the motor 108 rotates the output shaft 109 so that the pad is moved backward, via the service brake transmission. If the adjuster transmission 126 is engaged (i.e., electrical power to the electrically actuated clutch cut off so that it is mechanically locked), as shown at 207, the adjuster mechanisms are engaged and the threaded inserts 118 can rotate together with the rods 121 and bushings 120 in order to increase the distance between the brake pad 103 and the brake disc 101. The adjuster transmission 126 is again disengaged (i.e., the electrically actuated clutch is again electrically powered so it is mechanically released), as shown at 208 so that no further pad adjustment is performed.

FIG. 8B shows an alternative operation of the pad adjustment function, the difference being that the default is for the adjuster transmission 126 to be disengaged (i.e., with the electrically actuated clutch being electrically powered so it is mechanically released).

It should also be noted that the electrically actuated clutch 126 may be used as a safety feature. If, during brake application, the negative activation force is higher than the maximum desired negative force of the motor (−M), the brake control could activate clutch 126 and block further rotation of the motor. This could be important to avoid unwanted wheel-blockage. Furthermore, when the brake is applied, and upon failure on the brake control, the clutch 126 can be applied to get the brake to maintain its position.

Figures 9A, 9B:
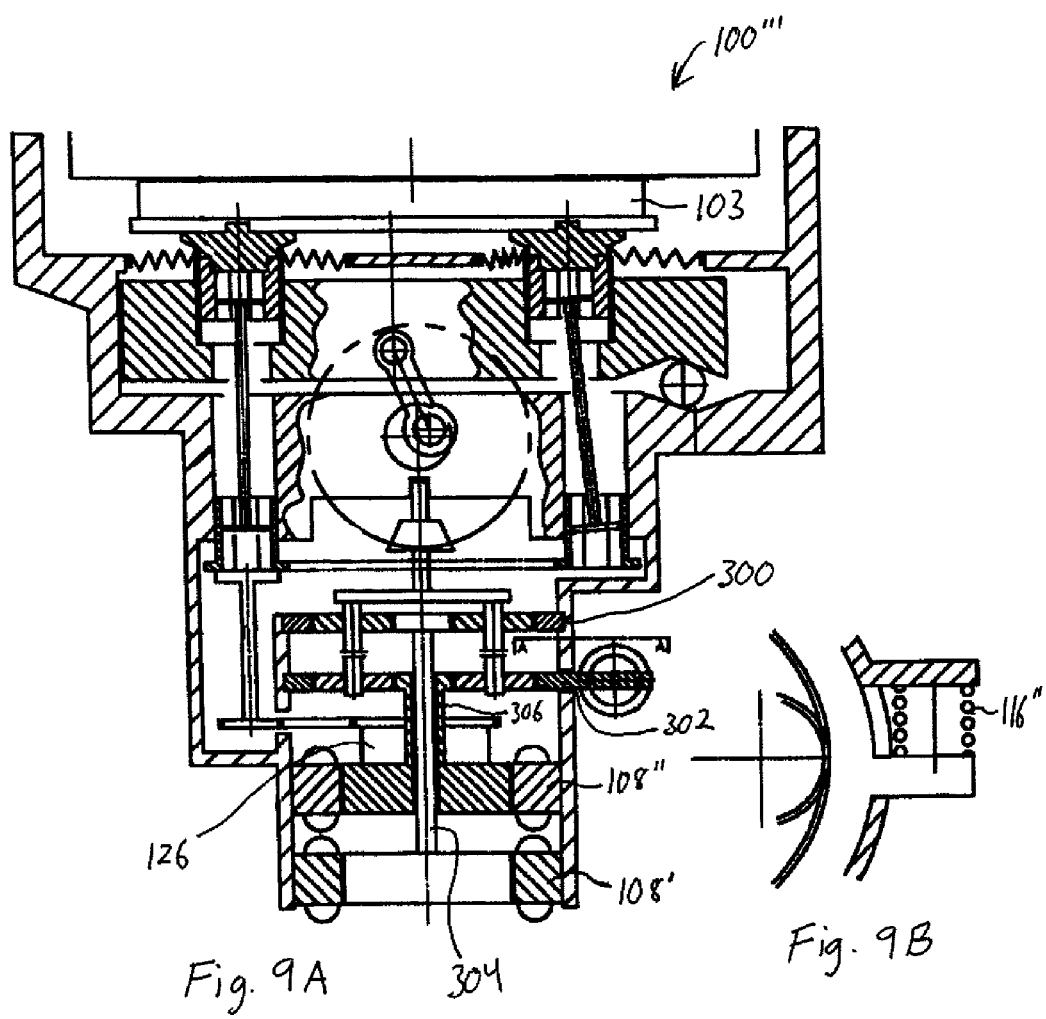
FIG. 9A is a schematic partially cross-sectional view of the electrically actuated brake assembly of FIG. 4A incorporating a second motor for purposes of redundancy, with the right half of the Figure illustrating an assembly with self-enforcing characteristics and the left half of the Figure illustrating an assembly without self-enforcing characteristics.
FIG. 9B is a schematic partially cross-sectional view, taken along line A-A of FIG. 9A illustrating in greater detail the configuration of the spring.

Referring now to FIGS. 9A and 9B, an electrically actuated brake assembly 100''' substantially similar to the assembly 100'' of FIGS. 4A and 4B is shown. As with FIG. 4A, the right half of FIG. 9A illustrates an assembly with self-enforcing characteristics and the left half of FIG. 9A illustrates an assembly without self-enforcing characteristics. The main difference between the assembly 100''' shown in FIGS. 9A and 9B and the assembly 100'' shown in FIGS. 4A and 4B is that, in assembly 100''', two motors 108', 108'', rather than one, are provided.

The two motors 108', 108'' create, via the service brake transmission (described in detail above in connection with FIG. 2), actuator force on brake pad 103. To maintaining a correct pad gap there is, in series with the service brake transmission, adjuster mechanisms (also described in detail above in connection with FIG. 2). Motor 108'' drives the adjuster mechanisms via an electrically actuated clutch 126, which as described in detail above, is disengaged when electrical power is supplied. The service brake transmission is partly split in two branches 300, 302 driven by, respectively, motor 108' and motor 108'' via shafts 304 and 306. The total actuator force is the sum of what is generated from motor 108' and motor 108''.

To maintain the desired parking brake actuator force, during cooling, it may be desirable to add extra elasticity in series with the service brake transmission for motor 108''. This extra elasticity is exemplified by spring 116'', which may be comprise a coil spring or a torsion or clock spring, as described in detail above in connection with FIGS. 4A through 4D.

In substantially all other respect, assembly 100''' is configured and operates as does the assembly 100'' of FIGS. 4A and 4B, discussed in detail above. As such, a description of the other elements of assembly 100''' is not repeated.

Figure 10A:
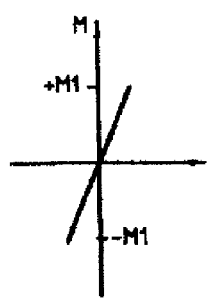
FIGS. 10A through 10C are graphical representations illustrating the available torque produced by the two motors of the electrically actuated brake assembly of FIG. 9A.
Figure 10B:
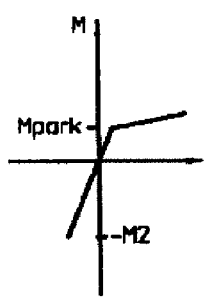
Figure 10C:
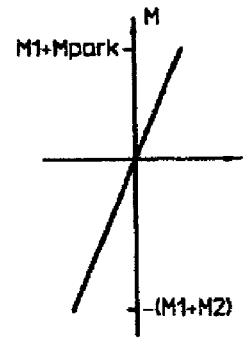

FIGS. 10A through 10C illustrate available torque from motors 108', 108''. More specifically, FIG. 10A illustrates available torque supplied from motor 108', which can range from a maximum negative torque (−M1), i.e., moving the brake pad 103 away from the brake disc 101, to a maximum positive torque (+M1), i.e., moving the brake pad 103 toward the brake disc 101. FIG. 10B illustrates available torque supplied from motor 108'', which can range from a maximum negative torque (−M2), i.e., moving the brake pad 103 away from the brake disc 101, to a maximum positive torque, i.e., moving the brake pad 103 toward the brake disc 101, which is limited to the torque supplied during parking brake application (Mpark). FIG. 10C illustrates the combined available torque supplied by both motors 108' and 108''.

Assembly 100''' is configured and operates similarly to the way assembly 100'' of FIGS. 4A and 4B, operates, as discussed above. Briefly, the electrically actuated clutch 126 is disengaged (electrical power on). Motor 108'' is applied with a torque exceeding Mpark and the spring 116'' is compressed. Due to the parking brake actuator force the adjuster mechanisms are locked against rotation. If, in this situation, the clutch 126 is engaged (electrical power off) the service brake transmission is locked and the parking brake actuator force is maintained.

It should be understood that in a self-energized brake, where normal friction variations (μ) are present between the brake pad 103 and the brake disc 101, the activation force from the motor 108', 108'' are very low. This means that each motor can work independently and provide full service braking at normal μ. However, when two motors 108', 108'' are provided, at extreme conditions with low μ (e.g., with ice or water on brake disc 101), the two motors 108', 108'' work together and create a high positive activation force (M1+Mpark). See FIG. 10C. At extreme conditions with high μ (e.g., with corrosion on brake disc 101 or frozen brake pad 103), the brake control may need a high negative activation force. The two motors 108', 108'' could together create such a high negative force −(M1+M2). See FIG. 10C.

Moreover, when two motors 108', 108'' are provided, the electrically actuated clutch 126 may be used as a safety feature. If during brake application, the negative activation force is higher than −(M1+M2), the brake control could activate clutch 126 and block further rotation of the motors. This could be important to avoid unwanted wheel-blockage. Furthermore, when the brake is applied, and upon failure on the brake control, the clutch 126 can be applied to get the brake to maintain its position.

The present invention, therefore, provides an electrically actuated brake assembly which is lower in cost, weight and complexity as compared to known assemblies, which includes integrated pad wear compensation functionality, which includes integrated park lock functionality, which can be used with both self-enforcing and non self-enforcing brakes, and which employs a single electrical motor to actuate the service brakes, to compensate for pad wear and to apply the park lock functionality.

Although the invention has been described with reference to a particular arrangement of parts, features and the like, these are not intended to exhaust all possible arrangements or features, and indeed many other modifications and variations will be ascertainable to those of skill in the art.

What is claimed is:

1. An electrically actuated brake assembly comprising:
    a brake disc in rotational engagement with a wheel of a vehicle;
    a brake pad which frictionally engages said brake disc when at least one of a service brake actuator force and a parking brake actuator force is applied thereto;
    an electric motor having an output shaft rotatable in both a forward direction and a reverse direction;
    a service brake transmission in operative rotational communication with the output shaft of said electric motor, said service brake transmission causing said brake pad to move toward said brake disc and exert the service brake actuator force thereon when the output shaft is rotated in the forward direction and causing said brake pad to move away from said brake disc and remove the service brake actuator force therefrom when the output shaft is rotated in the reverse direction;
    at least one adjuster mechanism, said adjuster mechanism being rotatable in one direction to decrease a distance between said brake pad and said brake disc and in another direction to increase the distance between said brake pad and said brake disc in order to control clearance between said brake pad and said brake disc; and
    an adjuster transmission comprising an electrically actuated clutch operatively connected between the output shaft of said electric motor and said adjuster mechanism, said adjuster transmission causing operative rotational communication between the output shaft of said electric motor and said adjuster mechanism when said adjuster transmission is engaged so as to transmit rotational movement of the output shaft of said electric motor to said adjuster mechanism, and causing there to be no operative rotational communication between the output shaft of said electric motor and said adjuster mechanism when said adjuster transmission is disengaged so as to not transmit rotational movement of the output shaft of said electric motor to said adjuster mechanism;
    wherein said at least one adjuster mechanism is rotated to an extent to apply the parking brake actuator force, and wherein said adjuster transmission is engaged when the parking brake actuator force is applied in order to prevent said at least one adjuster mechanism from rotating such that said adjuster transmission is employed as a park lock.

2. The electrically actuated brake assembly of claim 1 wherein the clutch is disengaged when electrical power is supplied thereto and is engaged when no electrical power is supplied thereto.

3. The electrically actuated brake assembly of claim 1 wherein said at least one adjuster mechanism comprises mating threaded parts in threaded engagement with one another, at least one of the threaded parts being operatively connected to said brake pad, and at least one other of the threaded parts being rotatable by said adjuster transmission.

4. The electrically actuated brake assembly of claim 1 further comprising a plate having at least one threaded recess in a face thereof facing said brake pad, and wherein said at least one adjuster mechanism comprises a threaded insert disposed in threaded engagement within the threaded recess of the plate, the threaded insert connected to said brake pad.

5. The electrically actuated brake assembly of claim 4 wherein operation of said service brake transmission causes axial movement of said plate, said at least one adjuster mechanism and said brake pad.

6. The electrically actuated brake assembly of claim 4 wherein operation of said adjuster transmission causes rotational movement of said at least one adjuster mechanism and, due to the threaded engagement between said at least one adjuster mechanism and the recess in said plate, axial movement of said at least one adjuster mechanism and said brake pad.

7. The electrically actuated brake assembly of claim 1 further comprising a spring exerting a force on said brake pad in series with the service brake actuator force caused by operation of said service brake transmission.

8. The electrically actuated brake assembly of claim 7 wherein the spring is a torsion spring arranged to exert a rotational force on said output shaft of said motor.

9. The electrically actuated brake assembly of claim 7 wherein the spring is a compression spring arranged to exert an axial force on said brake pad.

10. The electrically actuated brake assembly of claim 7 wherein the spring is a compression spring arranged to exert a rotational force on said output shaft of said motor.

11. The electrically actuated brake assembly of claim 1 wherein said brake assembly is a self-enforcing brake assembly.

12. The electrically actuated brake assembly of claim 1 wherein said electric motor comprises two electric motors, at least one of which is operatively connected to said adjuster mechanism via said adjuster transmission.

13. The electrically actuated brake assembly of claim 12 wherein said service brake transmission is at least partially split into two branches, each of the two branches being in operative rotational communication with one of the two electric motors.

14. An electrically actuated brake assembly comprising:
    a brake disc;
    a brake pad;
    an electric motor having a rotatable output shaft;
    a service brake transmission in operative rotational communication with the output shaft of said electric motor, said service brake transmission causing service braking of the vehicle in response to rotation of the output shaft of said electric motor;
    at least one adjuster mechanism, said adjuster mechanism being operable to adjust a distance between said brake pad and said brake disc in order to control clearance between said brake pad and said brake disc; and
    an adjuster transmission comprising an electrically actuated clutch operatively connected between the output shaft of said electric motor and said adjuster mechanism, said adjuster transmission causing operative rotational communication between the output shaft of said electric motor and said adjuster mechanism when said adjuster transmission is engaged so as to transmit rotational movement of the output shaft of said electric motor to said adjuster mechanism, and causing there to be no operative rotational communication between the output shaft of said electric motor and said adjuster mechanism when said adjuster transmission is disengaged so as to not transmit rotational movement of the output shaft of said electric motor to said adjuster mechanism; and
    wherein said at least one adjuster mechanism is rotated to an extent to apply a parking brake actuator force, and wherein said adjuster transmission is engaged when the parking brake actuator force is applied in order to prevent said at least one adjuster mechanism from rotating such that said adjuster transmission is employed as a park lock.

15. The electrically actuated brake assembly of claim 14 wherein the clutch is disengaged when electrical power is supplied thereto and is engaged when no electrical power is supplied thereto.

16. The electrically actuated brake assembly of claim 14 wherein said at least one adjuster mechanism comprises mating threaded parts in threaded engagement with one another, at least one of the threaded parts being operatively connected to said brake pad, and at least one other of the threaded parts being rotatable by said adjuster transmission.

17. The electrically actuated brake assembly of claim 14 further comprising a plate having at least one threaded recess in a face thereof facing said brake pad, and wherein said at least one adjuster mechanism comprises a threaded insert disposed in threaded engagement within the threaded recess of the plate, the threaded insert connected to said brake pad.

18. The electrically actuated brake assembly of claim 17 wherein operation of said service brake transmission causes axial movement of said plate, said at least one adjuster mechanism and said brake pad.

19. The electrically actuated brake assembly of claim 17 wherein operation of said adjuster transmission causes rotational movement of said at least one adjuster mechanism and, due to the threaded engagement between said at least one adjuster mechanism and the recess in said plate, axial movement of said at least one adjuster mechanism and said brake pad.

20. The electrically actuated brake assembly of claim 14 further comprising a spring exerting a force on said brake pad in series with a service brake actuator force caused by operation of said service brake transmission.

21. The electrically actuated brake assembly of claim 20 wherein the spring is a torsion spring arranged to exert a rotational force on said output shaft of said motor.

22. The electrically actuated brake assembly of claim 20 wherein the spring is a compression spring arranged to exert an axial force on said brake pad.

23. The electrically actuated brake assembly of claim 20 wherein the spring is a compression spring arranged to exert a rotational force on said output shaft of said motor.

24. The electrically actuated brake assembly of claim 14 wherein said brake assembly is a self-enforcing brake assembly.

25. The electrically actuated brake assembly of claim 14 wherein said electric motor comprises two electric motors, at least one of which is operatively connected to said adjuster mechanism via said adjuster transmission.

26. The electrically actuated brake assembly of claim 25 wherein said service brake transmission is at least partially split into two branches, each of the two branches being in operative rotational communication with one of the two electric motors.

27. A method of operating an electrically actuated brake assembly comprising a brake disc in rotational engagement with a wheel of a vehicle, a brake pad which frictionally engages said brake disc when at least one of a service brake actuator force and a parking brake actuator force is applied thereto, an electric motor having an output shaft rotatable in both a forward direction and a reverse direction, a service brake transmission in operative rotational communication with the output shaft of said electric motor, said service brake transmission causing said brake pad to move toward said brake disc and exert the service brake actuator force thereon when the output shaft is rotated in the forward direction and causing said brake pad to move away from said brake disc and remove the service brake actuator force therefrom when the output shaft is rotated in the reverse direction, at least one adjuster mechanism, said adjuster mechanism being rotatable in one direction to decrease a distance between said brake pad and said brake disc and in another direction to increase the distance between said brake pad and said brake disc in order to control clearance between said brake pad and said brake disc, and an adjuster transmission comprising an electrically actuated clutch operatively connected between the output shaft of said electric motor and said adjuster mechanism, said adjuster transmission causing operative rotational communication between the output shaft of said electric motor and said adjuster mechanism when said adjuster transmission is engaged so as to transmit rotational movement of the output shaft of said electric motor to said adjuster mechanism, and causing there to be no operative rotational communication between the output shaft of said electric motor and said adjuster mechanism when said adjuster transmission is disengaged so as to not transmit rotational movement of the output shaft of said electric motor to said adjuster mechanism, said method comprising the steps of:

rotating said at least one adjuster mechanism to an extent to apply the parking brake actuator force; and engaging said adjuster transmission when the parking brake actuator force is applied in order to prevent said at least one adjuster mechanism from rotating such that said adjuster transmission is employed as a park lock.

* * * * *